Aug. 10, 1926.
M. J. QUEVLI
FOOD CHOPPER
Filed Oct. 21, 1925
1,595,574
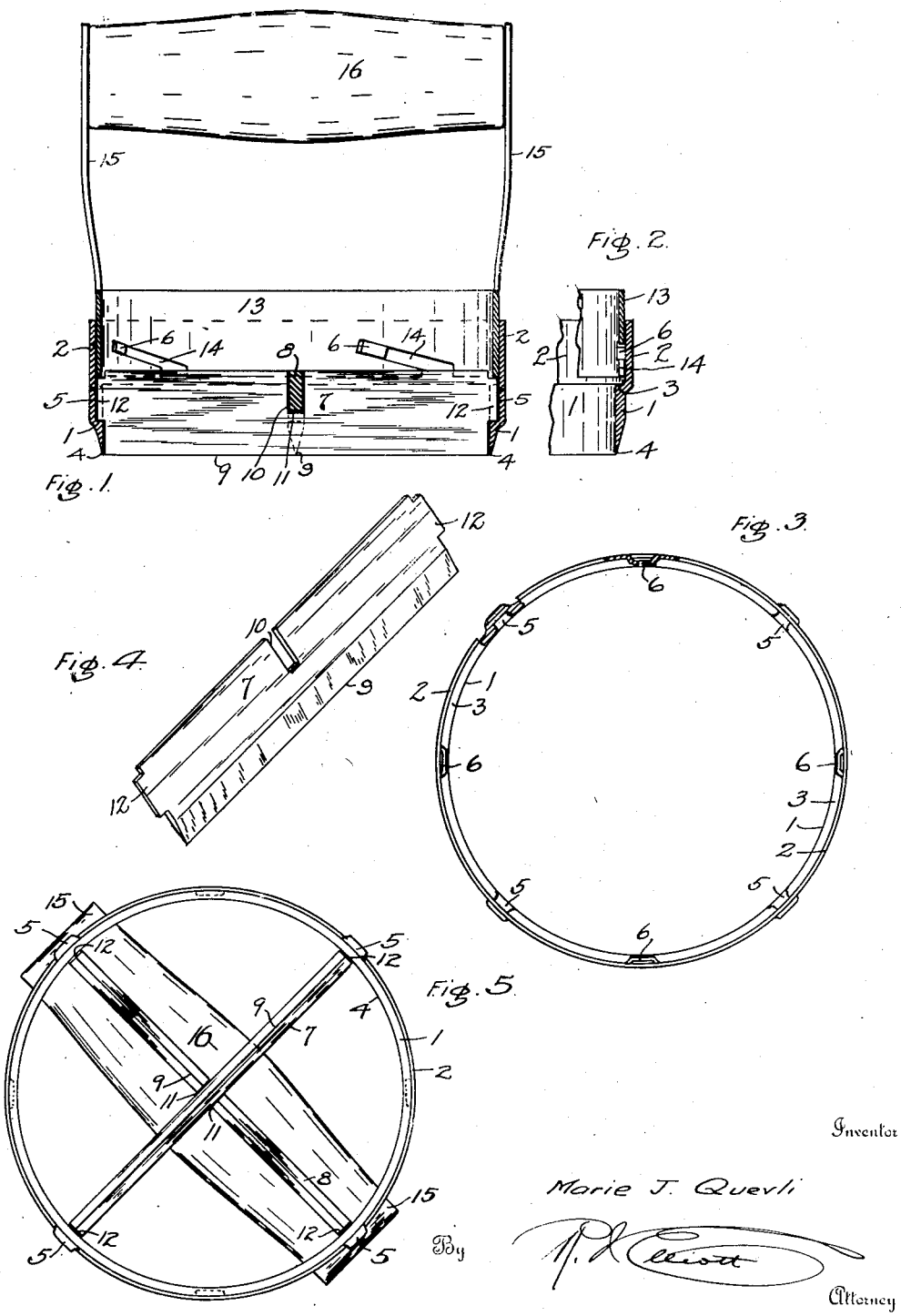
Inventor
Marie J. Quevli
By
Attorney Patented Aug. 10, 1926.

1,595,574

UNITED STATES PATENT OFFICE.

MARIE J. QUEVLI, OF TACOMA, WASHINGTON.

FOOD CHOPPER.

Application filed October 21, 1925. Serial No. 63,836.

This invention relates to tools for preparing foods for cooking or for use and especially to those adapted to cut or mince the food up into particles, and has for its objects, first, to provide such a device which will not permit the food being chopped to scatter excessively; second, which will make a clean and even cut and will not bruise the food; third, which can be readily taken apart for cleaning, polishing or sharpening; fourth, in which the knives are in separate pieces, each of which may be separately sharpened; fifth, in which the parts may be loosely fitted together but are clamped firmly in position when ready for use; and sixth, which is cheap to make, easy to assemble, and very effective in use.

I attain these and other objects by the devices and arrangements illustrated in the accompanying drawings, in which—

Fig. 1 is a vertical section through my device showing it assembled and ready for use, said section being taken parallel to one of the cross knives; Fig. 2 is a similar view of a portion thereof, the section being taken at one of the inclined slots; Fig. 3 is a top plan view of the circular knife, portions thereof being broken away to reveal the formation of the clamping lugs and the cross-knife sockets; Fig. 4 is a perspective view of one of the cross knives; and Fig. 5 is a bottom plan view of the complete device assembled together.

Similar numerals of reference refer to similar parts throughout the several views.

This improved food chopper consists of a ring-shaped knife; a pair of straight cross-knives; and a clamping ring and handle, and all these parts are separable and may fit together very loosely, thus permitting a practical degree of tolerance in the manufacture of the several parts of the chopper and permitting free interchange of said parts, but are clamped firmly together when fully assembled ready for use.

Referring to the drawings, the ring-shaped knife comprises a flat ring, having its lower portion 1 of slightly less diameter than its upper portion 2, each of said parts being cylindrical, thereby forming a shoulder 3 on the inner surface where the two said parts join. The outer lower edge of the lower part 1 is ground down to form a sharp cutting edge 4 extending entirely around the device. The lower portion 1 is provided with four equally spaced sockets or grooves 5, preferably pressed therein and adapted to receive the ends of the cross-knives as hereinafter described. The upper portion 2 is provided with four inward extending depressions equally spaced and forming lugs 6, adapted to engage the inclined slots to draw the clamping ring down into the knife ring to clamp the cross-knives in place. The lugs 6 may be conveniently placed about midway between the sockets 5 but at a higher level.

The cross-knives 7 and 8 each comprises a straight body, ground on both edges of its lower surface to form a sharp cutting edge 9. The knife 7 is cut downward at the center of its upper side by a slot 10 (Fig. 4) extending about one-half way down, while the knife 8 has a complementary slot 11 cut in its lower side and extending upward therein, said slots 10 and 11 being adapted to permit the two knives 7 and 8 to cross each other and to bring their cutting edges 9 in the same plane. Each knife 7 and 8 has a tenon 12 extending outward from each end and adapted to enter one of the above-described grooves 5 and to rest on the lower end thereof. The said groove 5 and tenons 12 are positioned so as to bring the straight cutting edges 9 in the same plane as the circular cutting edge 4. The upper ends of the tenons 12 are positioned to lie above the shoulder 3 of the main cylindrical knife body. When the clamping ring is pressed down on the said upper ends of the tenons 12 it firmly clamps the said knives 7 and 8 against any movement, vertical or lateral, in the space enclosed by the said cylindrical knife even though the said knives 7 and 8 may be loose within the said cylindrical knife until thus clamped. Thus it will be seen that the entire strain from the knives 7 and 8, when cutting, is transmitted direct to the clamp ring, and thus to the handle, without passing through the circular knife or any of the vertically sliding contacts therewith, thus preventing the binding of the said parts together and preserving the shape and utility of the chopper.

The clamp ring 13 is cylindrical and fits neatly within the upper portion 2 of the cylindrical knife. It is provided with four similar inclined slots 14 each extending up from the lower edge and adapted to receive one of the above-described lugs 6 extending inward from the inner surface of the said part 2. The lower edge of the ring 13 is adapted to engage the upper ends of all the tenons 12 of the knives 7 and 8. When the clamping ring 13 is inserted in the ring 2 it is placed so that the said lugs 6 will enter the openings of the slots 14 and then it is pressed down and simultaneously given a part turn on its axis, within the ring 2, thus causing the said inclined slots 14 to forcibly draw the ring 13 down further into the ring 2, and to bring its lower edge into clamping contact with the said tenons 12 of the knives 7 and 8. The working strain from the knife 4 is thus transmitted by the lugs 6 direct to the clamp ring 13 and thus to the handle without passing through the vertically sliding contacts between it and the straight knives, thus preventing distortion of the parts and preserving the usefulness of the chopper.

The clamp ring 13 is provided with two oppositely positioned upwardly extending ears 15 between which a suitable handle 16 may be secured in any desired manner.

It is evident that many variations may be incorporated in this improved chopper without departing from the invention as defined in the appended claims, as, for instance, one or both of the straight knives may be omitted, or they may be parallel with each other.

Having therefore, described my invention, what I claim is:—

1. A food chopper comprising a cylindrical knife; lugs extending inwardly therefrom; a pair of vertical grooves formed in the inner wall of said cylindrical knife; a straight knife, whose ends rest in said grooves and which extends across the interior of said cylindrical knife; a clamp ring fitting in said cylindrical knife and provided with inclined slots extending upward from its lower edge, each such slot being adapted to receive one said lug whereby the clamp ring is removably secured to said cylindrical knife and is forced down on the ends of said straight knife to clamp it in position therein.

2. A food chopper as set forth in claim 1, wherein said straight knife is provided with a tenon extending from each end, said tenon adapted to enter the corresponding groove in the cylindrical knife and to engage the bottom thereof, whereby the straight knife is supported in position with its cutting edge in the same plane as that of the cylindrical knife, the upper edge of said tenon being engaged by said clamp ring to clamp the knife therein.

3. A food chopper as set forth in claim 1, wherein a plurality of pairs of grooves are formed in said cylindrical knife; and a corresponding number of straight knives, one for each pair of grooves, are provided, said knives being formed whereby all their cutting edges are in the same plane as the cutting edge of the cylindrical knife and the upper edges of their ends lie in the same plane as the lower edge of said clamp ring whereby all the ends of said straight knives are equally and simultaneously pressed and clamped by the said clamp ring.

MARIE J. QUEVLI.